July 1, 1952   C. P. BALDWIN   2,601,958
CABLE REEL MECHANISM
Original Filed Dec. 20, 1946   2 SHEETS—SHEET 1

Inventor:
Clyde P. Baldwin.
by Charles F. Osgood,
Attorney.

July 1, 1952
C. P. BALDWIN
2,601,958
CABLE REEL MECHANISM
Original Filed Dec. 20, 1946
2 SHEETS—SHEET 2
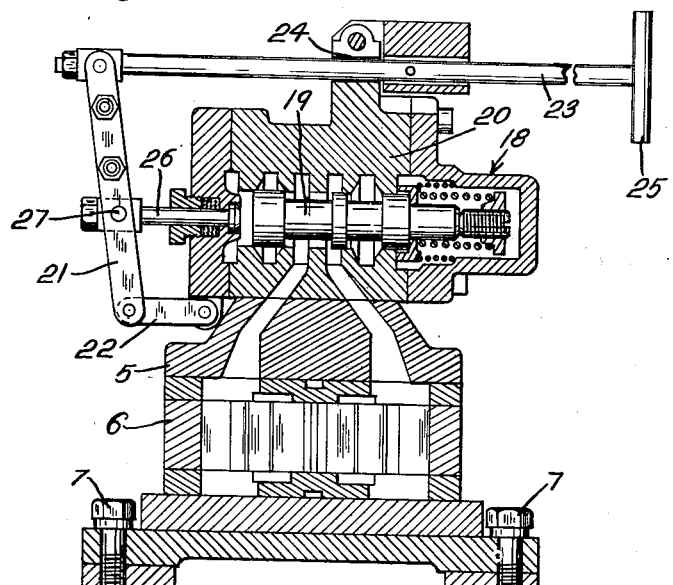
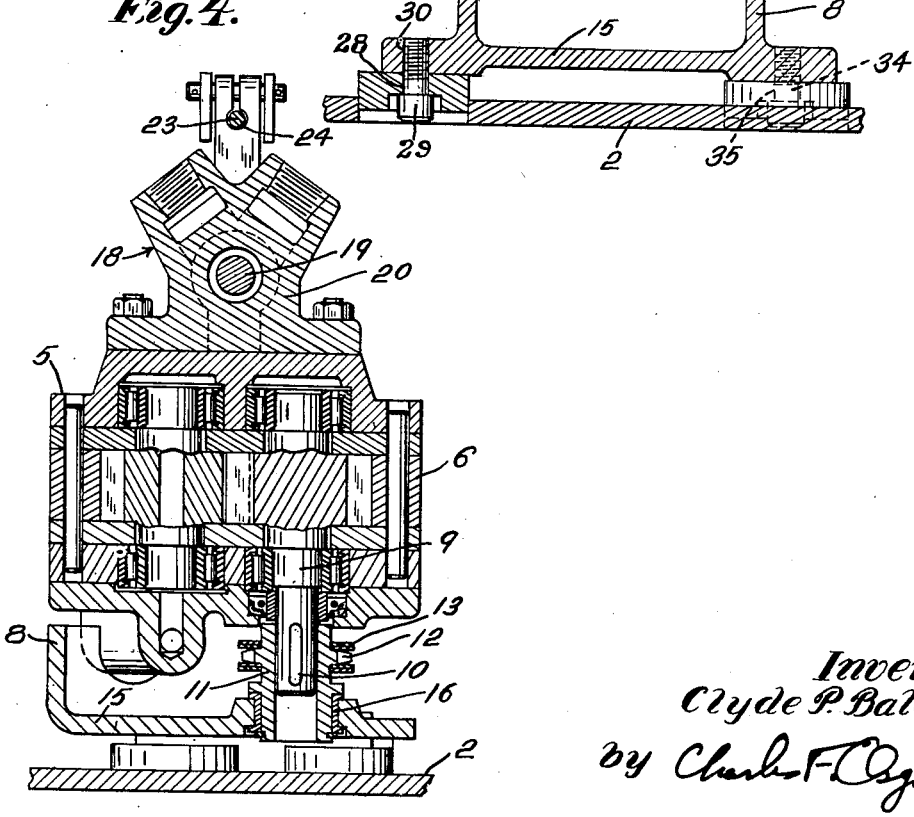
Inventor:
Clyde P. Baldwin.
by Charles F. Osgood,
Attorney.

Patented July 1, 1952

2,601,958

UNITED STATES PATENT OFFICE 2,601,958

CABLE REEL MECHANISM

Clyde P. Baldwin, Claremont, N. H., assignor to Joy Manufacturing Company, a corporation of Pennsylvania Original application December 20, 1946, Serial No. 717,398. Divided and this application October 21, 1950, Serial No. 191,456

7 Claims. (Cl. 242—90)

This invention relates to cable reel mechanism and more particularly to an improved reel mechanism for the power conductor cable of a coal mining apparatus.

An object of the present invention is to provide an improved cable reel mechanism. Another object is to provide an improved driving means for an electric cable reel. A further object is to provide an improved mounting structure for the reel driving motor. Yet another object is to provide an improved chain and sprocket drive mechanism for a cable reel and improved means for adjusting the tension of the drive chain. A still further object is to provide an improved motor mounting whereby the driving motor may be readily removed without disturbing the other driving connections for the reel. Other objects and advantages of the invention will, however, more fully appear.

The present application is a division of my copending application, Serial No. 717,398, filed December 20, 1946.

In the accompanying drawings there is shown for purposes of illustration one form which the invention may assume in practice.

In these drawings:

Fig. 3 is a central longitudinally extending vertical section taken substantially on line 3—3 of Fig. 2.

Fig. 4 is a cross sectional view taken substantially on line 4—4 of Fig. 2.

Figure 1:
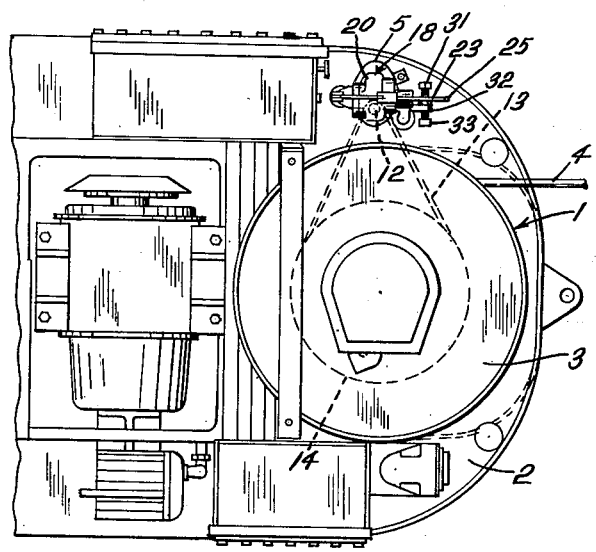
Fig. 1 is a fragmentary plan view of a mining apparatus with which a preferred illustration embodiment of the improved cable reel mechanism is associated.

In this illustrative embodiment of the invention, as shown in the drawings, the improved cable reel mechanism generally designated 1 is mounted on a support 2 which desirably comprises the frame of a coal mining apparatus, as fully disclosed in my copending application, Serial No. 717,398, above referred to. Evidently, the cable reel mechanism of the present invention may have general application and is not limited to use with a mining apparatus.

The cable reeling mechanism is for a power conductor cable by which electric power is conducted to the electric motors of the mining apparatus and includes an electric cable reel 3 arranged horizontally on the support 2 and mounted to revolve about a vertical axis, and wound on this reel is a usual electric power conductor cable 4. The cable reel is adapted to be driven in cable winding direction by a motor 5 herein desirably a conventional hydraulic motor of the intermeshing gear type (see Figs. 3 and 4) having a casing 6 detachably secured, as by screws 7, to a horizontal bottom frame 8, the latter in turn mounted on the support 2. This motor has its vertical power shaft 9 splined or otherwise detachably coupled at 10 within the tubular hub 11 of a chain sprocket 12 and this chain sprocket engages and drives an endless drive chain 13 (Fig. 1) connected to a chain sprocket 14 suitably secured to the cable reel 3. The sprocket 12 is arranged beneath the motor casing, as shown in Fig. 4, in the space between the latter and the bottom wall 15 of the frame 8 and is journaled at 16 within the bottom wall 15 of the frame, in the manner shown. When the motor casing 6 is detached from the frame 8, upon release of the screws 7, the entire motor unit may be bodily lifted to move the motor shaft 9 out of the sprocket hub 11 while the sprocket 12 remains undisturbed in its bearing mounting on the frame 8.

The reel driving motor 5 is controlled by a valve mechanism generally designated 18, which may be similar to that disclosed in a copending application to H. H. Vanderzee, Serial No. 571,991, filed January 9, 1945, now Patent No. 2,593,367, dated April 15, 1952, owned by the assignee of the present application. This valve mechanism includes a shiftable control and by-pass valve 19 contained in a housing 20 attached to the top of the motor casing 6, for controlling flow of liquid under pressure with respect to the reel motor to control reel rotation or to by-pass liquid through the motor. The control valve 19 may be shifted axially by a lever 21 pivotally connected at its lower end (Fig. 3) by floating links 22 to the valve housing and pivotally connected at its upper end to an operating rod 23 lying across the top of the valve housing and guided on the latter at 24 and provided with an operating handle 25. A valve actuating plunger 26 is pivotally connected at 27 to the lever 21 and may be actuated by the latter to engage the valve to shift the position of the latter. The cable reel 3 may be driven by the motor 5 in cable unwinding direction and the conductor cable may be drawn off from the reel with the valve 19 controlling rotation of the reel in cable unwinding direction, all in the manner disclosed in the Vanderzee application mentioned above. The valve mechanism does not per se, enter into the present invention, and since it is fully disclosed in the Vanderzee application further detailed description thereof is herein deemed unnecessary.

Figure 2:
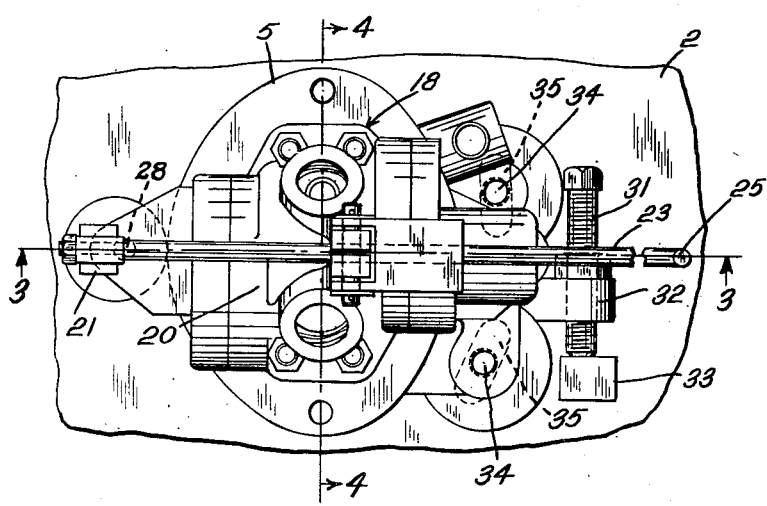
Fig. 2 is an enlarged fragmentary play view illustrating the cable reel driving motor and the control valve mechanism therefor.

The horizontal bottom frame 8 which supports the reel driving motor 5 is pivoted at 28, to swing horizontally, on a vertical screw 29 passing through an opening in a member welded or otherwise secured to the support 2 and threadedly secured at 30 to the swingable frame 8. An adjusting screw 31 (see Fig. 2) is threaded within a lug 32 integral with the frame 8 and engages a stationary abutment 33 on the support 2 so that when the screw is adjusted the frame 8 may be swung horizontally about its pivot 28 to change the distance between axes of the sprocket 12 and the reel sprocket 14 so that the tension of the drive chain 13 may be varied, as desired. Clamping screws 34 threaded in the swingable frame 8 pass through elongated slots 35 in the support and when these screws are tightened they serve to clamp rigidly the swingable frame 8 in adjusted position to the support. The hydraulic system of the mining apparatus with which the valve mechanism and reel motor are associated is likewise fully disclosed in my copending application, Serial No. 717,398, mentioned above.

As a result of this invention an improved electric cable reel mechanism is provided having an improved mounting for its driving motor whereby the motor may be readily adjusted horizontally to vary the tension of the driving connections between the motor and the cable reel. By the provision of the novel detachable mounting structure for the reel motor the latter may be removed as a unit without disturbing the other driving connections for the cable reel. The reel motor structure as disclosed is relatively simple, compact and rugged in design, well adapted for its intended purpose. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an apparatus of the character disclosed, the combination comprising a support, a cable reeling mechanism on said support for conducting power medium to the apparatus and comprising a cable reel and a driving motor therefor detachably secured to said support, a driving connection on said support and connected to said reel, and an axially releasable detachable coupling between said motor and an element of said driving connection whereby said motor when detached from said support may be removed bodily axially as a unit from said element of said driving connection while the latter and said reel remain undisturbed on said support.

2. In an apparatus of the character disclosed, the combination comprising a support, a cable reeling mechanism on said support for conducting power medium to the apparatus and comprising a cable reel and a driving motor therefor detachably secured to said support and having a power shaft, a drive chain sprocket journaled on said support beneath said motor, a driven chain sprocket secured to said cable reel, an endless drive chain connecting said sprockets, and an axially releasable detachable coupling between the motor power shaft and said drive sprocket whereby said motor when detached from said support may be lifted bodily axially as a unit from said support to disconnect the motor power shaft from said drive sprocket while the latter remains undisturbed on said support.

3. In an apparatus of the character disclosed, the combination comprising a support, means for conducting power medium to the apparatus comprising a cable reel on said support having a driven sprocket, a motor having a shaft and pivotally mounted on said support to swing about an axis parallel to the axis of motor shaft rotation and having a drive sprocket, an endless drive chain for connecting said sprockets together, and adjustable devices for swinging said motor on its pivotal mounting relative to said support to vary the distance between the sprocket axes to vary the tension of said chain, said adjustable devices normally maintaining said motor against swinging movement on its pivotal mounting relative to said support.

4. In an apparatus of the character disclosed, the combination comprising a support, means for conducting power medium to the apparatus comprising a cable reel on said support, a frame pivotally mounted on said support to swing relative thereto, a motor detachably secured to said frame, a drive sprocket journaled on said support, a sprocket secured to said reel, an endless drive chain for connecting said sprockets together, means for swinging said frame on its pivotal mounting to vary the distance between the sprocket axes to vary the tension of said chain, and an axially releasable coupling between said motor and said drive sprocket whereby said motor when the latter is detached from said frame it may be moved bodily axially as a unit from said support to uncouple the motor from said drive sprocket while the latter and said frame remain undisturbed on said support.

5. In a cable reel mechanism, the combination comprising a horizontal support, an electric cable reel journaled on said support for rotation about a vertical axis, a motor having a vertical power shaft, axially releasable means for detachably mounting said motor on said support, a driving element connected to said reel, a bearing on said support in which said driving element is journaled, a driving connection between said driving element and said reel, and a detachable coupling between said motor shaft and said driving element permitting axial separation of said motor shaft from said driving element whereby said motor may be detached from its mounting on said support and lifted vertically axially as a unit from said driving element while the latter remains undisturbed in its bearing on said support.

6. In a cable reel mechanism, the combination comprising a horizontal support, an electric cable reel journaled on said support for rotation about a vertical axis, a horizontal frame pivotally mounted on said support to swing horizontally relative thereto, a motor on said swingable frame, axially releasable means for detachably securing said motor to said swingable frame, a rotary driving element journaled on said swingable frame and detachably coupled to the motor shaft, a rotary driven element secured to said reel, a flexible endless driving element connecting said driving element to said driven element, an adjustable means connected between said support and said frame for swinging the latter horizontally about its pivot to vary the distance apart of the axes of said rotary driving and driven elements thereby to vary the tension of said flexible driving element and for holding said frame rigidly in adjusted position, said detachable securing means being axially releasable to permit axial bodily removal of said motor from said frame irrespective of the adjusted position of the latter about its pivot.

7. In a cable reel mechanism, the combination comprising a support, an electric cable reel journaled on said support to turn about a vertical axis, a frame pivotally mounted on said support to swing horizontally relative thereto, a motor detachably mounted on said swingable frame, a drive sprocket, a bearing on said frame in which said drive sprocket is journaled, an axially releasable, detachable coupling between the motor shaft and said sprocket, a driven sprocket secured to said reel, an endless drive chain for connecting said driving sprocket to said driven sprocket, means for swinging said frame to change the distance apart of the axes of said driving and driven sprockets thereby to vary the tension of said endless chain, and means for detachably securing said motor to said frame, said motor upon release of said detachable securing means adapted to be bodily axially lifted from said frame without disturbing said driving sprocket in its bearing irrespective of the adjusted position of said frame about its pivot, and said drive shaft sliding axially from its coupling with said drive sprocket when said motor is bodily lifted as aforesaid from said frame.

CLYDE P. BALDWIN.

REFERENCES CITED

The following references are of record in the file of this patent:

UNITED STATES PATENTS

| Number | Name | Date |
|---|---|---|
| 1,069,037 | Sessions | July 29, 1913 |
| 1,203,390 | Noble | Oct. 31, 1916 |
| 1,209,310 | Levin | Dec. 19, 1916 |
| 1,247,421 | Levin | Nov. 20, 1917 |